United States Patent
Thenus et al.

(10) Patent No.: US 10,698,430 B2
(45) Date of Patent: Jun. 30, 2020

(54) METHOD AND APPARATUS OF CURRENT BALANCING FOR MULTIPLE PHASE POWER CONVERTER

(71) Applicant: Intel Corporation, Santa Clara, CA (US)

(72) Inventors: Fenardi Thenus, Portland, OR (US); Peng Zou, Tumwater, WA (US); Joseph T. Dibene, II, Olympia, WA (US)

(73) Assignee: Intel Corporation, Santa Clara, CA (US)

(*) Notice: Subject to any disclaimer, the term of this patent is extended or adjusted under 35 U.S.C. 154(b) by 268 days.

(21) Appl. No.: 13/720,050

(22) Filed: Dec. 19, 2012

(65) Prior Publication Data

US 2014/0167711 A1 Jun. 19, 2014

(51) Int. Cl.
G05F 1/46 (2006.01)
H02M 3/158 (2006.01)

(52) U.S. Cl.
CPC .......... *G05F 1/468* (2013.01); *H02M 3/1584* (2013.01)

(58) Field of Classification Search
CPC ... G05F 1/46; G05F 1/62; G05F 1/468; B64G 1/443; G01R 19/0084; G01R 19/252; H02M 3/156; H02M 3/158; H02M 3/1584
USPC .......... 323/234, 271–272, 282–285
See application file for complete search history.

(56) References Cited

U.S. PATENT DOCUMENTS

| | | | |
|---|---|---|---|
| 4,477,765 A * | 10/1984 | Glennon et al. | 322/20 |
| 5,568,044 A * | 10/1996 | Bittner | H02M 3/156 323/224 |
| 5,852,554 A | 12/1998 | Yamamoto | |
| 5,920,274 A * | 7/1999 | Gowda | H03M 1/123 341/155 |
| 6,545,545 B1 * | 4/2003 | Fernandez-Texon | H03L 7/099 327/159 |
| 2004/0232899 A1 * | 11/2004 | Herbert | H02M 3/1584 323/282 |
| 2008/0100357 A1 * | 5/2008 | Bae | H03L 7/0812 327/158 |
| 2010/0109713 A1 * | 5/2010 | Harriman | H02M 3/1584 327/103 |
| 2010/0164477 A1 * | 7/2010 | Trivedi et al. | 324/107 |

(Continued)

FOREIGN PATENT DOCUMENTS

JP 08-331854 A 12/1996
JP 10-323016 A 12/1998

(Continued)

OTHER PUBLICATIONS

Office Action Received for China Patent Application No. 201320897441.7, dated Apr. 11, 2014, 2 pages of office action and 2 pages of english translation.

International Search Report and Written Opinion Received for PCT Patent Application No. PCT/US2013/048766, dated Oct. 1, 2013, 11 pages.

Taiwan Office Action dated Feb. 2, 2015, for Taiwan Patent Application No. 102143562 (13 pages).

(Continued)

*Primary Examiner* — Shawki S Ismail
*Assistant Examiner* — Monica Mata
(74) *Attorney, Agent, or Firm* — Green, Howard & Mughal LLP

(57) ABSTRACT

In some embodiments described herein, proposed schemes utilize a duty-cycle sensing technique to detect load current imbalance in each individual inductor, and then adjusts the duty cycles for the specific phases through a digital duty cycle tuner.

29 Claims, 6 Drawing Sheets

(56) References Cited

U.S. PATENT DOCUMENTS

| | | | |
|---|---|---|---|
| 2010/0320983 A1* | 12/2010 | Wu | H02M 3/156 323/283 |
| 2011/0241636 A1* | 10/2011 | Wu | H02M 3/1584 323/272 |
| 2011/0267019 A1 | 11/2011 | Krishnamurthy | |
| 2012/0049813 A1 | 3/2012 | Huang et al. | |
| 2012/0229104 A1* | 9/2012 | Pierson et al. | 323/234 |
| 2012/0249093 A1* | 10/2012 | Grbo et al. | 323/234 |
| 2013/0194848 A1* | 8/2013 | Bernardinis et al. | 363/126 |

FOREIGN PATENT DOCUMENTS

| | | |
|---|---|---|
| TW | 201210179 | 3/2012 |
| WO | 2014/099034 A1 | 6/2014 |

OTHER PUBLICATIONS

Office Action Received for China Patent Application No. 201320897441.7, dated Aug. 5, 2014, 1 page of office action and 2 pages of english translation.

International Preliminary Report on Patentability for International Patent Application No. PCT/US2013/048766, dated Jul. 2, 2015.

Notice of Rejection for Taiwan Patent Application No. 104126249, dated Mar. 16, 2016, Translation.

Notice of Grant, dated Jul. 8, 2015, for Taiwan Patent Application No. 102143562. No translation available.

Notice of Grant, dated Sep. 4, 2014, for Chinese Patent Application No. 201320897441.7.

Office Action, dated Sep. 9, 2016, for Taiwan Patent Application No. 104126249.

\* cited by examiner

US 10,698,430 B2

METHOD AND APPARATUS OF CURRENT BALANCING FOR MULTIPLE PHASE POWER CONVERTER

TECHNICAL FIELD

The present invention relates generally to power regulators, and in particular, to multi-phase converters with current load balancing.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Figure 1:
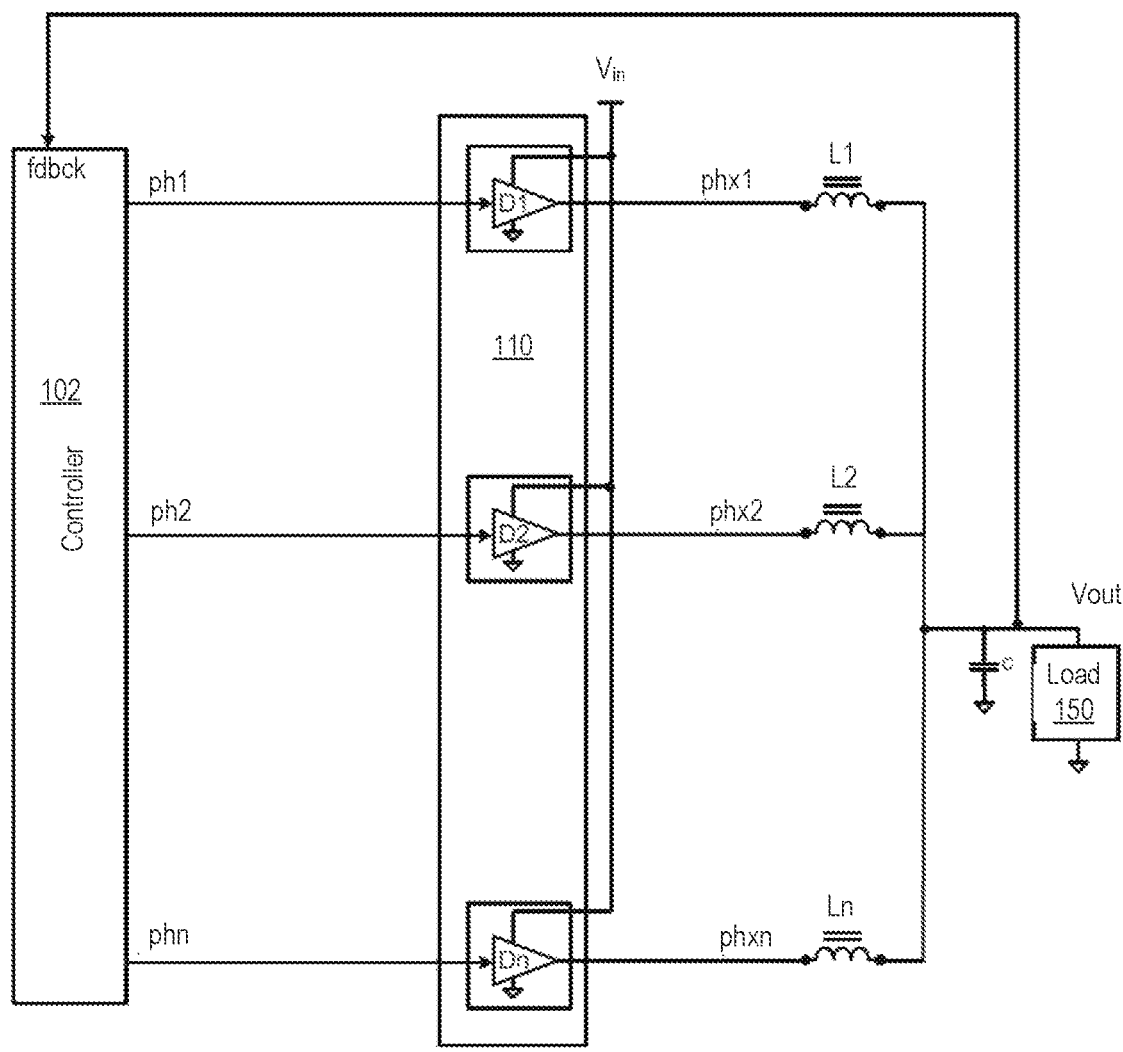
FIG. 1 shows a conventional multi-phase DC-DC converter.

FIG. 1 shows a conventional multi-phase switching DC-DC power converter (in this example, a buck converter). The depicted multi-phase converter has a controller 102, bridge 110, and an output section including inductors (L1 to Ln) and a capacitor (C), all coupled together to provide a regulated output voltage (Vout) to a load 150. The bridge 110 includes multiple switch devices (D1 to Dn), each corresponding to a phase of the multi-phase converter and providing current to a corresponding inductor (L1 to Ln) by providing the input voltage (Vin) at he switch device output when the switch is turned on. One or more feedback signals (represented as the "fdbck" signal) are fed back from the output (Vout) to the controller to control the bridge devices (D1 to Dn) to provide more, or less, power to the load in order to regulate Vout at a desired voltage level.

Multiple-phase switching power converters (such as the depicted voltage regulator of FIG. 1) conduct current through the inductors and capacitor(s) via the switch devices. The duty cycle Pulse train signals with controllable duty cycles are typically applied to the switch devices to control the amounts of current that they provide to their inductors. The time-average current in an inductor is proportional to the duty cycle of the switch device driving the inductor. Accordingly, the amount of current provided to the load, and thus the voltage at the load, can be controlled by controlling the duty cycle of the pulses driving the switch devices.

Typically, multi-phase switching power converters utilize pulse width modulation (PWM) to adjust the duty cycles of the pulse trains accordingly, with each pulse being at a unique phase. One design challenge is to balance the average current driven through the inductor phases, as inductor and other circuit component mismatches can cause unbalanced load currents. In fact, phase current balancing may be particularly important for integrated voltage regulators (multi-phase converters that are part of the same chip as the load to which they supply) since the unbalanced load currents can more readily cause the relatively small inductors to saturate.

In some embodiments described herein, proposed schemes utilize a duty-cycle sensing technique to detect load current imbalance in each individual inductor, and then adjusts the duty cycles for the specific phases through a digital duty cycle tuner.

Figure 2:
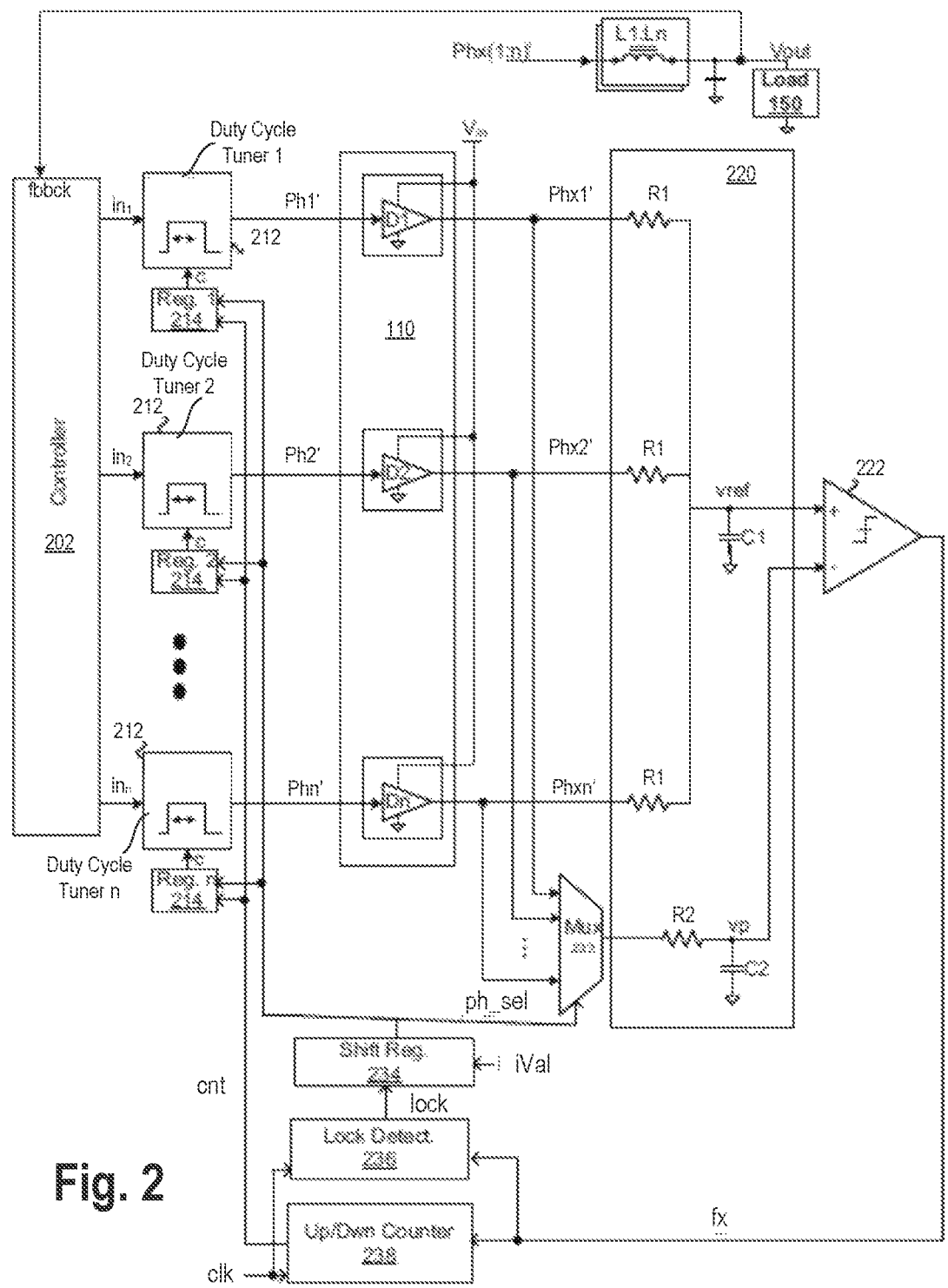
FIG. 2 shows a multi-phase DC-DC converter with load balancing in accordance with some embodiments.

FIG. 2 shows a multi-phase switching converter with load balancing circuits in accordance with some embodiments. A multi-phase switching converter, as illustrated in FIG. 1, is shown, but with additional load balancing circuitry in accordance with some embodiments. The load balancing circuitry generally comprises comparison circuitry and duty cycle tuner circuitry. In the depicted embodiment, the comparison circuitry includes a filter block 220 and a voltage comparator 222. The filter block includes resistors R1 and a capacitor C1, coupled as shown, for providing an average phase leg voltage (vref) and resistor R2 and capacitor C2 for providing individual phase leg voltages (vp) from multiplexer 232. A phase leg voltage is a voltage that is proportional to the current in the phase leg, i.e., proportional to the current coming out of the switch device for a given phase.

The voltage (vref) at C1 is an integration, or average, of all of the switch device output levels (Phx1' to Phxn'). The voltage (vp) at C2 will be the voltage level at a switch device output, as selected by Mux 232. These voltages are essentially DC levels. The resistor and capacitor values for R1, R2, C1, and C2 may be any suitable values to achieve stable, measurable indicative voltages. In some embodiments, the R1C1 and R2C2 time constants should be sufficiently large, e.g., 100 times the period (T) of the PWM clock, although this is not necessary for practicing the invention. So, for example, if the bridge switches are being driven at a clock frequency of 100 MHz (T=10 nS, then the RC time constants would be greater than 1 µS.) In some embodiments, each phase voltage is compared against he average (vref) in order to control it, through its duty cycle tuner, to approach (if not equal) the average value, which results in the phase leg currents, in turn, more closely approaching each other and thus, more closely approaching balance with one another. When the selected phx' signal is not equal to vref, unbalanced load current is sensed (detected). Balancing adjustments are then applied through tuning the duty-cycle of the selected phase signal.

In the depicted embodiment, the duty cycle tuner circuitry comprises: (1) duty cycle tuners 212, with associated control registers 214, for tuning (or offsetting) the duty cycle in each phase, and (2) logic blocks (234, 236, and 238) for setting the duty cycle adjustment in each duty cycle tuner based on the comparisons between the average phase voltage (vref) and the individual voltages (vp). It should be appreciated that the logic blocks may be implemented with any suitable digital logic (software, state machines, discrete gates, etc.). The depicted blocks include a shift register 234, a lock detector 236, and an up/down counter 238, coupled together as shown. Counter 238 is an m-bit up-down counter that, for example, may count up when input fx is high and down when input fx is low. Lock detection circuit 236 is designed to sense when vp is sufficiently close to (if not equal to) vref.

In operation, the switch devices (D1 to Dn) are controlled by multiphase pulse train signals (Ph1' to Phn'), e.g., pulse width modulated rectangular waves. Digital duty cycle tuners 212 are used to alter the duty cycle of a selected phase (in1-inn) signal. A duty-cycle tuner may be any circuit that modifies the duration ratio of switch device "on" (e.g., binary high level) to off (e.g., low level) over a period of an incoming switch device signal. In the depicted embodiment, the duty-cycle ratio is adjusted through an m-bit control (c) input from the control register 214.

Figure 3:
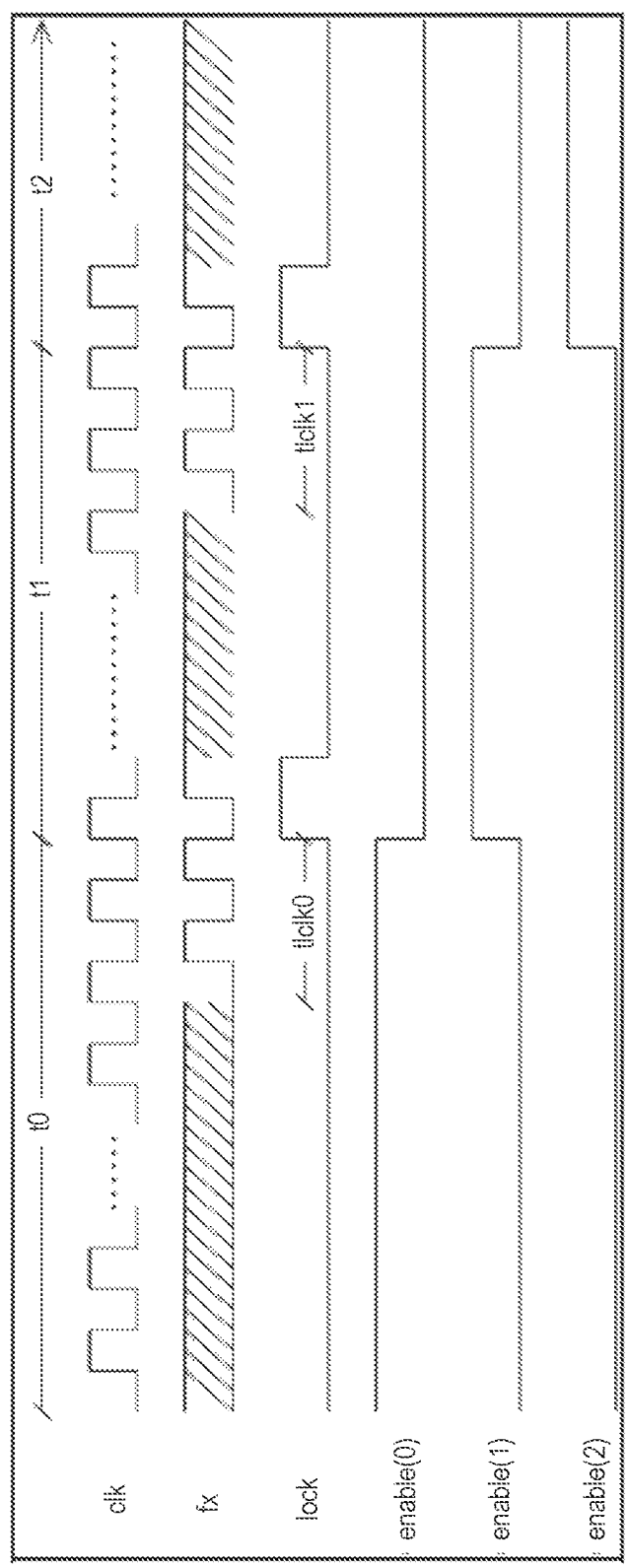
FIG. 3 is a timing diagram showing signals from the multi-phase converter of FIG. 2 in accordance with some embodiments.

Reference is made to both FIGS. 2 and 3 for a description of an exemplary duty cycle tuning operation in accordance with some embodiments. FIG. 3 is a timing diagram for current sensing for the first 3 phases. t1, t2 and t3 are the time required to balance Phase 1, Phase 2 and Phase 3 load currents, respectively. Other phases would follow similar timing patterns. The duty cycle tuners may be tuned at any time, for example, initially, at start-up or throughout chip operation. The phases are each tuned, one at a time, e.g. beginning with phase 1 and ending with phase n. With this example, initially, register 1 (register 214 for phase 1) and Mux 232 are set to read and select the phx1 node. This is done through a default, initial value (iVal) signal, which is a preset initial digital value applied to shift register 234. The Mux 232 is used to select one of the incoming Phx inputs. so, with this example, initially it selects Phx1'.

Comparator 222 compares vref (the average phase voltage level) with vp for the selected phase. The comparator generates a binary signal fx that indicates whether vp is smaller or greater than the average voltage (vref). For example, fx may be '0 if vp is greater than vref and '1 if vp is less than vref. If vp is less than vref, (fx at high state for this example), the counter 238 will count up and in turn, increase the duty-cycle for the selected phase by increasing its control register 214 value. As long as vp is below vref, the duty-cycle will keep increasing. After one or more cycles, vp will eventually exceed vref, causing fx to switch, e.g., to a low state. During this low state, the counter counts down and lowers the duty-cycle. This process repeats itself until fx eventually forms a periodic signal (see FIG. 3). It will have a frequency of clk/2, where "clk" is a clock signal input to the counter 238 and with a frequency typically less than that of the PWM clock.

The lock detector 236 senses this event and then generates a lock signal, as indicated in FIG. 3. For example, as indicated in the timing diagram of FIG. 3, it may "look" for fx toggling between high and low for one or more cycles. When this condition is satisfied, the lock circuit then asserts its output (e.g., to a high state) for a duration of a clock cycle. To make sure fx has entered periodic signal state, lock detect will wait a few cycles before lock signal is asserted. This causes the shift register to advance to the next phase. In turn, this results in the m-bit counter value to be stored in the register 214 for the phase that had just been evaluated. The shift register output (ph_sel) not only enables/disables control registers 214 for a selected phase, but also, it is used to select the input of Mux 232. This overall process is repeated for the remaining phases until the load currents for all phases are suitably balanced with one another.

Figure 4:
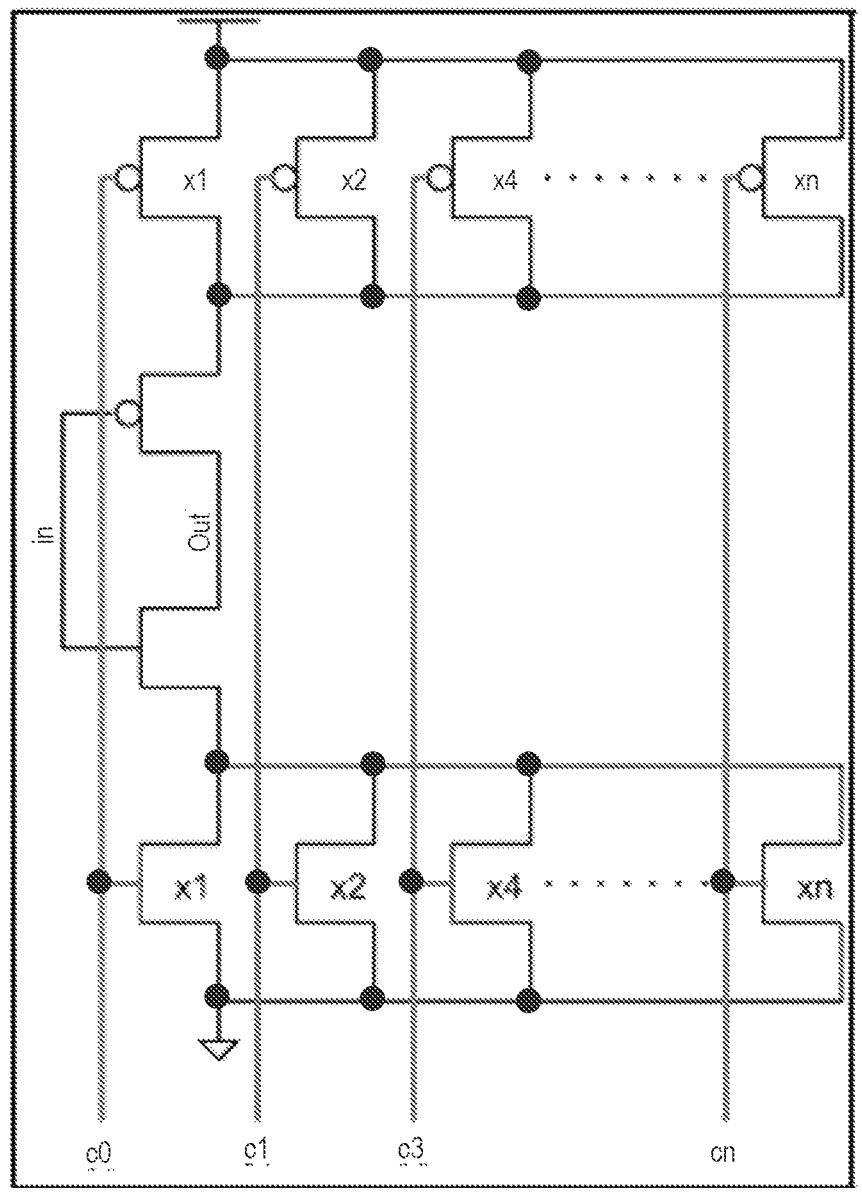
FIG. 4 shows a circuit for a duty cycle tuner in accordance with some embodiments.

FIG. 4 shows a possible circuit for implementing a duty-cycle tuner circuit 212. The circuit comprises an inverter formed from MOS devices N0 and P0, along with PMOS devices P1 through Pn and NMOS devices N1 through Nn, all coupled together as shown. It comprises in input (in), output (out), and n-bit control interface (C1-Cn). In this embodiment, the P and N devices that are coupled to the control interface are binary weighted such that the least significant bit (C1) devices (P1, N1) are half the strength of the associated P2, N2 devices, which are half the strength of the associated P3, N3 devices, and so on. Thus, the higher the digital control value, the stronger the N devices, relative to the P devices, resulting in a decreased duty cycle. This approach is based on current starved topology where the slope of rising and falling edges is proportional to the strengths of the current sources formed from the controllable P and N devices.

The duty cycle tuner is disposed between a switch device for the phase to be selected and a phase signal output. The duty cycle tuner includes a digital current source adjustment to adjust a rise and fall time for a pulse signal from the phase signal output.

Figure 5:
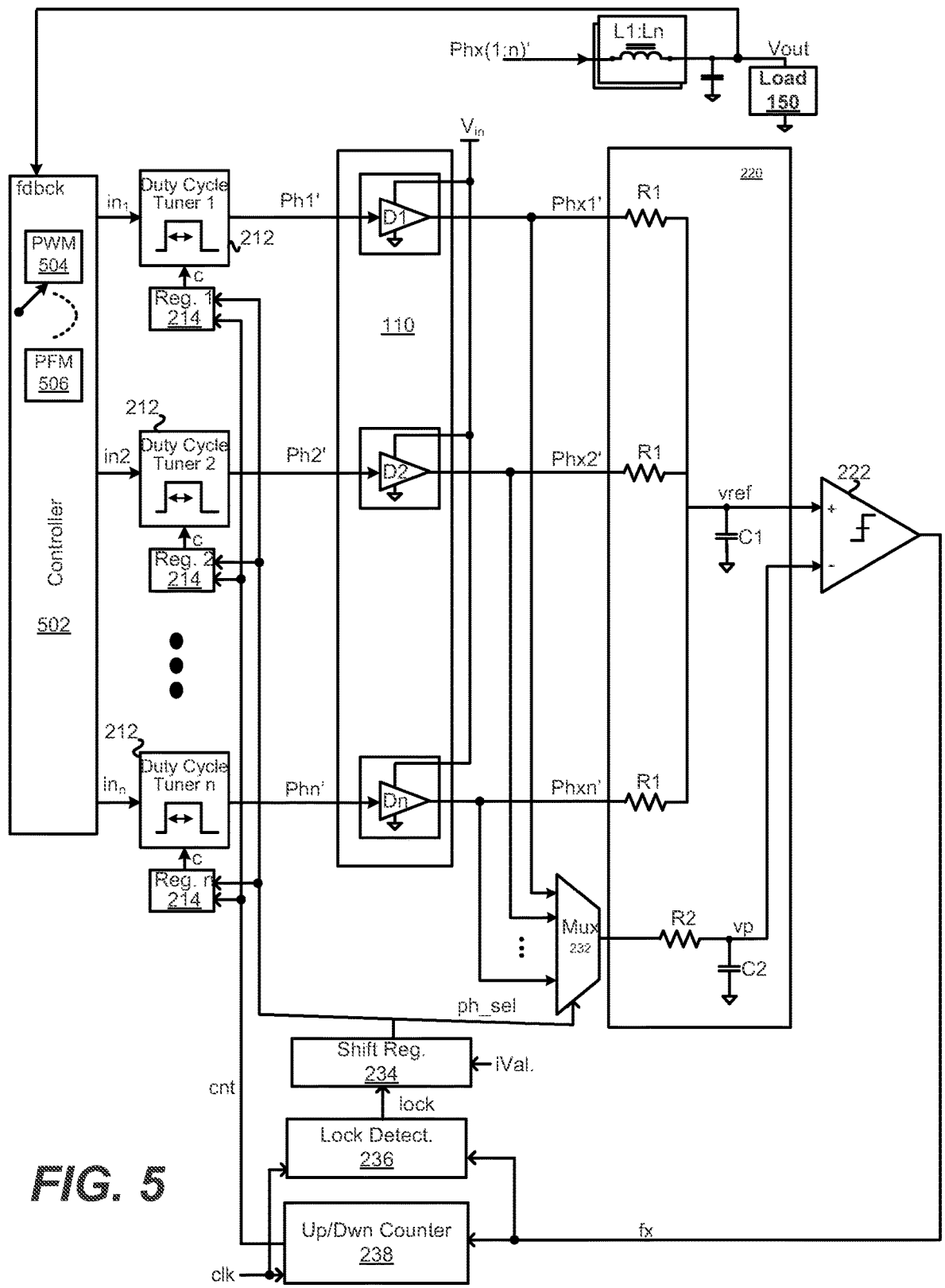
FIG. 5 shows a multi-phase converter with load balancing and with PFM and PWM phase signal generation in accordance with some embodiments.

FIG. 5 shows a multi-phase converter with load balancing, similar to the circuit of FIG. 2, except that it includes a controller that generates the phase signals with either PWM or PFM (pulsed frequency modulation). PWM typically operates most efficiently for higher load currents, e.g., 0.5 A and higher. On the other hand, they may be inefficient for smaller current loads. Accordingly, the controller 502 may switch to a PFM mode when the output load current is below a certain threshold (e.g., 0.5 A). In this way, the DC-DC converter of FIG. 5 may operate efficiently over a large current range, e.g., from 1 micro Amp to 2 or 3 Amps.

Figure 6:
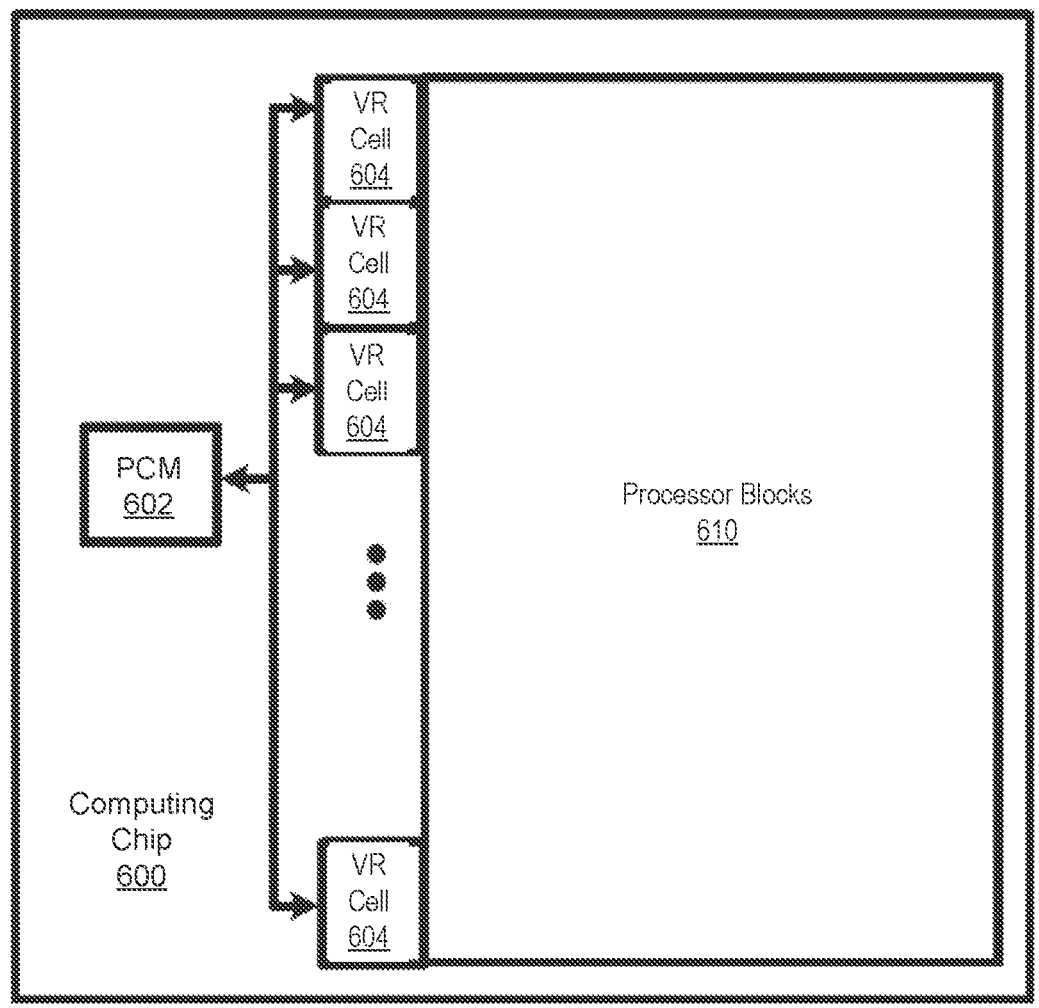
FIG. 6 shows a chip with multiple VR cells with load balancing in accordance with some embodiment

FIG. 6 shows a chip or chip package with multiple VR cells 604 with load balancing as discussed herein. The VR cells 604 are integrated into the chip to supply power to a processor block 610 and are managed by a power control module 602. The cells 604 may be ganged together in different combinations to provide one or more different voltage domains with different current sourcing capabilities. In some embodiments, the VR cells 604 are integrated onto the same chip as the processor. The passive output components (inductors, capacitors) may also be integrated into the chip, or chip package (e.g., on the die or in the substrate). Since these inductors may be integrated into the chip, they may have relatively small inductances and thus, be more susceptible to unwanted saturation. Accordingly, current balancing techniques discussed herein may be even more beneficial in such integrated environments.

In the preceding description and following claims, the following terms should be construed as follows: The terms "coupled" and "connected," along with their derivatives, may be used. It should be understood that these terms are not intended as synonyms for each other. Rather, in particular embodiments, "connected" is used to indicate that two or more elements are in direct physical or electrical contact with each other. "Coupled" is used to indicate that two or more elements co-operate or interact with each other, but they may or may not be in direct physical or electrical contact.

The term "PMOS transistor" refers to a P-type metal oxide semiconductor field effect transistor. Likewise, "NMOS transistor" refers to an N-type metal oxide semiconductor field effect transistor. It should be appreciated that whenever the terms: "MOS transistor", "NMOS transistor", or "PMOS transistor" are used, unless otherwise expressly indicated or dictated by the nature of their use, they are being used in an exemplary manner. They encompass the different varieties of MOS devices including devices with different VTs, material types, insulator thicknesses, gate(s) configurations, to mention just a few. Moreover, unless specifically referred to as MOS or the like, the term transistor can include other suitable transistor types, e.g., junction-field-effect transistors, bipolar-junction transistors, metal semiconductor FETs, and various types of three dimensional transistors, MOS or otherwise, known today or not yet developed.

The invention is not limited to the embodiments described, but can be practiced with modification and alteration within the spirit and scope of the appended claims. For example, it should be appreciated that the present invention is applicable for use with all types of semiconductor integrated circuit ("IC") chips. Examples of these IC chips include but are not limited to processors, controllers, chip set components, programmable logic arrays (PLA), memory chips, network chips, and the like.

It should also be appreciated that in some of the drawings, signal conductor lines are represented with lines. Some may be thicker, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

It should be appreciated that example sizes/models/values/ranges may have been given, although the present invention is not limited to the same. As manufacturing techniques (e.g., photolithography) mature over time, it is expected that devices of smaller size could be manufactured. In addition, well known power/ground connections to IC chips and other components may or may not be shown within the FIGS, for simplicity of illustration and, discussion, and so as not to obscure the invention. Further, arrangements may be shown in block diagram form in order to avoid obscuring the invention, and also in view of the fact that specifics with respect to implementation of such block diagram arrangements are highly dependent upon the platform within which the present invention is to be implemented, i.e., such specifics should be well within purview of one skilled in the art. Where specific details (e.g., circuits) are set forth in order to describe example embodiments of the invention, it should be apparent to one skilled in the art that the invention can be practiced without, or with variation of, these specific details. The description is thus to be regarded as illustrative instead of limiting.

What is claimed is:

1. A chip, comprising:
   a multi-phase converter having:
      circuitry for balancing phases including a comparison circuitry to compare a selected voltage for a phase, from among multiple voltages for phases, against an average phase voltage,
      a multiplexer, wherein the selected voltage for the phase is provided by the multiplexer, which is to be controlled by a code according to an output of the comparison circuitry, wherein the code is to cause the multiplexer to choose from among the multiple voltages for phases an output which is an unfiltered version of the selected voltage; and
      a shift register which provides the code to the multiplexer, wherein the shift register receives a lock signal from a lock detector, wherein the lock signal is based on a comparison of a filtered version of the selected voltage for the phase and the average phase voltage; and
   a duty cycle tuner for the phase to be selected, wherein the duty cycle tuner is to be tuned based on one or more comparisons between a selected voltage for the phase and the average phase voltage.

2. The chip of claim 1, in which the multi-phase converter is coupled to supply power to a processor that is part of the chip.

3. The chip of claim 1, wherein output inductors for the multi-phase converter are disposed in a die off the chip.

4. The chip of claim 1, in which the comparison circuitry includes a low-pass filter coupled to a switch device for the phase to be selected to provide the voltage for the phase to be selected.

5. The chip of claim 4, in which the low-pass filter comprises a resistor and a capacitor.

6. The chip of claim 4, in which the low-pass filter is coupled to the switch device for the phase to be selected through the multiplexer that couples the low-pass filter to other phase switch devices when they are selected.

7. The chip of claim 4, in which the comparison circuitry comprises a second low-pass filter having an input coupled to each phase of the multi-phase converter, and wherein the second low-pass filter is to provide the average phase voltage.

8. The chip of claim 1, in which the duty cycle tuner is disposed between a switch device for the phase to be selected and a phase signal output.

9. The chip of claim 8, in which the duty cycle tuner includes a digital current source adjuster to adjust a rise and fall time for a pulse signal from the phase signal output.

10. A multi-phase voltage regulator, comprising:
    two or more phase legs each phase leg having a duty cycle tuner, the duty cycle tuner for each phase leg is to be tuned based on a comparison between a selected voltage for a phase, associated with the phase leg of the duty cycle tuner, against an average phase voltage for the two or more phase legs,
    a multiplexer, wherein the selected voltage for the phase is selected by the multiplexer which is to be controlled by a code according to the comparison; and
    a shift register which provides the code to the multiplexer, wherein the code is to cause the multiplexer to choose from among multiple voltages for phases an output which is an unfiltered version of the selected voltage, and
    wherein the shift register receives a lock signal from a lock detector, wherein the lock signal is based on a comparison of a filtered version of the selected voltage for the phase and the average phase voltage.

11. The multi-phase voltage regulator of claim 10, in which the multi-phase voltage regulator is coupled to supply power to a processor that is part of a chip of the multi-phase voltage regulator.

12. The multi-phase voltage regulator of claim 11, wherein output inductors for the multi-phase voltage regulator are disposed in a die off the chip.

13. The multi-phase voltage regulator of claim 10, comprising a comparison circuitry to perform the comparison, the comparison circuitry including a low-pass filter coupled to a switch device for a phase leg, from among the two or more phase legs, being tuned to provide a voltage for the comparison.

14. The multi-phase voltage regulator of claim 13, in which the low-pass filter comprises a resistor and a capacitor.

15. The multi-phase voltage regulator of claim 13, in which the low-pass filter is coupled to a switch device for the phase leg to be compared through the multiplexer that couples the low-pass filter to other phase switch devices when they are selected.

16. The multi-phase voltage regulator of claim 13, in which the comparison circuitry comprises a second low-pass filter having an input coupled to each phase leg, the second low-pass filter to provide the average phase voltage.

17. The multi-phase voltage regulator of claim 10, in which the duty cycle tuner is disposed between:
   a switch device for a phase leg, from among the two or more phase legs, to be compared, and
   a phase generator output.

18. The multi-phase voltage regulator of claim 17, in which the duty cycle tuner includes a digital current source adjuster to adjust a rise and fall time for a pulse signal from the phase signal output.

19. A method comprising:
   selecting, via a multiplexer, a phase leg from among a multiple of phase legs in a multi-phase converter;
   comparing a voltage in the selected phase leg against an average voltage for the multiple phase legs of the multi-phase converter;
   generating a code, by a shift register, for the multiplexer;
   adjusting a duty cycle tuner for the phase leg based on the comparing, wherein the multiplexer is to be controlled by the code according to an output of the comparison circuitry, and wherein the code is to cause the multiplexer to choose from among the multiple phase legs an output which is an unfiltered version of the voltage of the selected phase leg;
   receiving, by the shift register, a lock signal from a lock detector, wherein the lock signal is based on a comparison of a filtered version of the voltage of selected phase leg and the average voltage.

20. The method of claim 19, in which there is a separate duty cycle tuner for each phase leg of the multi-phase converter.

21. The chip of claim 4, wherein the switch device is controlled by a multiphase pulse train signal.

22. The chip of claim 21, wherein the duty cycle tuner is to modify a duration ratio of switch device on duration to switch device off duration over a period of the multiphase pulse train signal.

23. The chip of claim 1, wherein an output of the comparison circuitry is coupled to an up-down counter.

24. The chip of claim 23, wherein an output of the comparison circuitry is coupled to the lock detector.

25. The chip of claim 23, wherein the output of the comparison circuitry is a periodic output when the selected voltage for the phase, from among the multiple voltages for phases, is just above or just below the average phase voltage.

26. The chip of claim 25, wherein the lock detector is to generate the lock signal after the comparison circuitry is to generate the periodic output.

27. The chip of claim 25 comprises a controller having a clock with a frequency which is half a frequency of the periodic output from the comparison circuitry.

28. The chip of claim 27, wherein the controller is to generate input, for the duty cycle tuner, with either pulse width modulation (PWM) or pulse frequency modulation (PFM).

29. The chip of claim 28, wherein the controller is operable to switch between PWM and PFM.

* * * * *